United States Patent
Khan et al.

(10) Patent No.: US 12,243,290 B2
(45) Date of Patent: Mar. 4, 2025

(54) VIDEO TRANSFORMER FOR DEEPFAKE DETECTION WITH INCREMENTAL LEARNING

(71) Applicant: Mohamed bin Zayed University of Artificial Intelligence, Abu Dhabi (AE)

(72) Inventors: Sohail Ahmed Khan, Abu Dhabi (AE); Hang Dai, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 384 days.

(21) Appl. No.: 17/835,453

(22) Filed: Jun. 8, 2022

(65) Prior Publication Data
US 2023/0401824 A1    Dec. 14, 2023

(51) Int. Cl.
*G06V 10/77* (2022.01)
*G06T 7/40* (2017.01)
(Continued)

(52) U.S. Cl.
CPC ............ *G06V 10/7715* (2022.01); *G06T 7/40* (2013.01); *G06V 10/54* (2022.01); *G06V 10/776* (2022.01);
(Continued)

(58) Field of Classification Search
CPC .. G06V 10/7715; G06V 10/54; G06V 10/776; G06V 10/82; G06V 20/49; G06V 20/70; G06V 40/161; G06V 40/40; G06V 20/46; G06T 7/40; G06T 2207/20081; G06T 2207/20084; G06T 2207/30201;
(Continued)

(56) References Cited

U.S. PATENT DOCUMENTS 11,908,233 B2 * 2/2024 Nagano ..................... G06T 5/80
2020/0402284 A1 * 12/2020 Saragih ................ G06V 10/757
(Continued)

OTHER PUBLICATIONS

Deressa Wodajo, et al., "Deepfake Video Detection Using Convolutional Vision Transformer", Computer Science > Computer Vision and Pattern Recognition (cs.CV), arXiv:2102.11126v1 [cs.CV], Feb. 22, 2021, 9 pages (Year: 2021).*
(Continued)

*Primary Examiner* — Henok Shiferaw
*Assistant Examiner* — Dion J Satcher
(74) *Attorney, Agent, or Firm* — Oblon, McClelland, Maier & Neustadt, L.L.P.

(57) ABSTRACT

A method, apparatus, and system for detecting DeepFake videos, includes an input device for inputting a potential DeepFake video, the input device inputs a sequence of video frames of the video, and processing circuitry. The processing circuitry detects faces frame by frame in the video to obtain consecutive face images, creates UV texture maps from the face images, inputs both face images and corresponding UV texture maps, extracts image feature maps, by a convolution neural network (CNN) backbone, from the input face images and corresponding UV texture maps and forms an input data structure, receives the input data structure, by a video transformer model that includes multiple encoders, and computes, by the video transformer model, a classification of the video as being Real or Fake. A display device plays back the potential DeepFake video and an indication that the video is Real or Fake.

16 Claims, 10 Drawing Sheets

(51) Int. Cl.
| | |
|---|---|
| *G06V 10/54* | (2022.01) |
| *G06V 10/776* | (2022.01) |
| *G06V 10/82* | (2022.01) |
| *G06V 20/40* | (2022.01) |
| *G06V 20/70* | (2022.01) |
| *G06V 40/16* | (2022.01) |
| *G06V 40/40* | (2022.01) |
| *H04N 21/44* | (2011.01) |
| *H04N 21/637* | (2011.01) |

(52) U.S. Cl.
CPC .............. *G06V 10/82* (2022.01); *G06V 20/41* (2022.01); *G06V 20/49* (2022.01); *G06V 20/70* (2022.01); *G06V 40/161* (2022.01); *G06V 40/40* (2022.01); *H04N 21/44008* (2013.01); *H04N 21/637* (2013.01); *G06T 2207/20081* (2013.01); *G06T 2207/20084* (2013.01); *G06T 2207/30201* (2013.01)

(58) Field of Classification Search
CPC .... G06T 2207/10016; H04N 21/44008; H04N 21/637
See application file for complete search history.

(56) References Cited

U.S. PATENT DOCUMENTS

| | | | |
|---|---|---|---|
| 2021/0097260 | A1 | 4/2021 | Verma et al. |
| 2021/0334935 | A1* | 10/2021 | Grigoriev ................. G06N 3/08 |
| 2022/0004904 | A1* | 1/2022 | Stemmer ............. G06F 18/2148 |
| 2022/0150068 | A1* | 5/2022 | Streit ................... G06V 10/454 |

OTHER PUBLICATIONS

Dolhansky, Brian, et al., "The DeepFake Detection Challenge Dataset", Computer Science > Computer Vision and Pattern Recognition (cs.CV), arXiv:2006.07397 [cs.CV], Oct. 28, 2020, 13 pages (Year: 2021).*

Bernhard, Egger, 2020. 3D Morphable Face Models—Past, Present, and Future. ACM Trans. Graph. 39, 5, Article 157 (Oct. 2020), 38 pages. https://doi.org/10.1145/3395208 (Year: 2020).*

Deressa Wodajo, et al., "Deepfake Video Detection Using Convolutional Vision Transformer", Computer Science > Computer Vision and Pattern Recognition (cs.CV), arXiv:2102.11126v1 [cs.CV], Feb. 22, 2021, 9 pages (Year: 2021) (Year: 2021).*

Dolhansky, Brian, et al., "The DeepFake Detection Challenge Dataset", Computer Science > Computer Vision and Pattern Recognition (cs.CV), arXiv:2006.07397 [cs.CV], Oct. 28, 2020, 13 pages (Year: 2021) (Year: 2021).*

Bernhard, Egger, 2020. 3D Morphable Face Models—Past, Present, and Future. ACM Trans. Graph. 39, 5, Article 157 (Oct. 2020), 38 pages. https://doi.org/10.1145/3395208 (Year: 2020) (Year: 2020).*

Deressa Wodajo, et al., "Deepfake Video Detection Using Convolutional Vision Transformer", Computer Science > Computer Vision and Pattern Recognition (cs.CV), arXiv:2102.11126v1 [cs.CV], Feb. 22, 2021, 9 pages.

Aminollah Khormali, et al., "DFDT: An End-to-End DeepFake Detection Framework Using Vision Transformer", Applied Sciences, vol. 12, No. 6, Mar. 14, 2022, pp. 1-17.

Aya Ismail, et al., "A New Deep Learning-Based Methodology for Video Deepfake Detection Using XGBoost", Sensors, vol. 21, No. 16, Aug. 10, 2021, pp. 1-15.

* cited by examiner

VIDEO TRANSFORMER FOR DEEPFAKE DETECTION WITH INCREMENTAL LEARNING

STATEMENT REGARDING PRIOR DISCLOSURE BY THE INVENTORS

Aspects of this technology are described in an article Sohail Ahmed Khan and Hang Dai. 2021. Video Transformer for Deepfake Detection with Incremental Learning. In Proceedings of the 29th ACM International Conference on Multimedia (MM '21), Oct. 20-24, 2021, Virtual Event, China. ACM, New York, NY, USA, 8 pages, and is herein incorporated by reference in its entirety.

BACKGROUND

Technical Field

The present disclosure is directed to a video transformer trained by incremental learning for detecting deepfake videos. The video transformer uses a 3D face reconstruction method to generate UV texture from a single input face image. Both face images and UV texture maps are used to extract the image features.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent developments in deep learning and the availability of large scale datasets have led to powerful deep generative models that can generate highly realistic synthetic videos. State-of-the-art generative models have enormous advantages, but those advantages have a down side. The generative models are also being used for malicious purposes. One application of the generative models is deepfake video generation. Generative models have evolved to an extent that, it is difficult to classify the real versus the fake videos. DeepFake videos can be used for unethical and malicious purposes, for example, spreading false propaganda, impersonating political leaders saying or doing unethical things, and defaming innocent individuals. DeepFake videos can be grouped into four categories: face replacement, facial re-enactment, face editing, and complete face synthesis. See Yisroel Mirsky and Wenke Lee. January, 2021. The Creation and Detection of Deepfakes: A Survey. In *Association for Computing Machinery (ACM)*. https://dl.acm.org/doi/10.1145/3425780, incorporated herein by reference in its entirety. A face replacement is where the content of one face is replaced with that of another face. A facial re-enactment is where a source is used to drive the expression, mouth, gaze, pose, or body of a target. Face editing is where the attributes of a target are added, altered, or removed. A complete face synthesis is where the DeepFake is created with no target as a basis.

DeepFake video generation techniques are increasing exponentially and becoming more and more difficult to detect. Current detection systems are not in a capacity to detect manipulated media effectively. In a DeepFake Detection Challenge (DFDC), the models achieve much worse performance when tested on unseen data than that on the DFDC test set. See Brian Dolhansky, Joanna Bitton, Ben Pflaum, Jikuo Lu, Russ Howes, Menglin Wang, and Cristian Canton Ferrer. 2020. The DeepFake Detection Challenge (DFDC) Dataset. *arXiv: Computer Vision and Pattern Recognition* (2020), incorporated herein by reference in its entirety.

Several studies have been conducted in the past to detect forged media. Most of the early methods employ Convolutional Neural Networks (CNN) based approaches to detect DeepFake video. However, the early techniques struggle against newer DeepFake detection benchmarks. DeepFake video generation is continuously evolving.

In Rössler et al., Rössler propose a diverse and high quality DeepFake dataset, which they call, FaceForensicss++ dataset. See Andreas Rössler, Davide Cozzolino, Luisa Verdoliva, Christian Riess, Justus Thies, and Matthias Nießner. 2019. FaceForensics++: Learning to Detect Manipulated Facial Images. arXiv:1901.08971 [cs.CV], incorporated herein by reference in its entirety. They employ a simple Xception network pre-trained on imagenet dataset, and fine-tune it on FaceForensics++ dataset. See Francois Chollet. 2017. Xception: Deep Learning with Depthwise Separable Convolutions. 2017 *IEEE Conference on Computer Vision and Pattern Recognition (CVPR)* (2017), 1800-1807, incorporated herein by reference in its entirety. They report excellent performance scores on fake datasets (FaceSwap, Face2Face, DeepFakes, NeuralTextures), which are subsets of FaceForensicss++ dataset. See Rössler et al. However, the detection models lack the generalization capabilities on real world data. In Li et al., Li propose novel image representation technique to detect forged face images. See Lingzhi Li, Jianmin Bao, Ting Zhang, Hao Yang, Dong Chen, Fang Wen, and Baining Guo. 2020. Face X-ray for More General Face Forgery Detection. In *Proceedings of the IEEE/CVF Conference on Computer Vision and Pattern Recognition (CVPR)*. IEEE, 5001-5010. https://arxiv.org/abs/1912.13458; and Rössler et al, each incorporated herein by reference in their entirety.

Afchar et al. proposed a face forgery detection network called MesoNet. See Darius Afchar, Vincent Nozick, Junichi Yamagishi, and Isao Echizen. 2018. MesoNet: a Compact Facial Video Forgery Detection Network. In *IEEE International Workshop on Information Forensics and Security (WIFS)*. IEEE. https://arxiv.org/abs/1809.00888, incorporated herein by reference in its entirety. They propose two networks Meso-4 and Meso Inception-4 with a small number of layers which focus on mesoscopic features in face images. They evaluate their networks on a public dataset and a dataset they generate from videos available online. See Rössler et al. Ciftci et al. propose a DeepFake video detection system and construct a DeepFake dataset. See Umur Aybars Ciftci, Ilke Demir, and Lijun Yin. 2020. FakeCatcher: Detection of Synthetic Portrait Videos using Biological Signals. In *IEEE Transactions on Pattern Analysis and Machine Intelligence*. IEEE. https://arxiv.org/abs/1901.02212, incorporated herein by reference in its entirety. The proposed method employs biological signals hidden in portrait videos. The motivation is that the biological signals are neither temporally nor spatially conserved in manipulated videos. They extract remote photoplethysmography (rPPG) signals from various face parts and combine those features to train their models. It achieves better performance on DeepFake video detection compared to image based detection methods. Since it relies on biological signals, which measures the subtle changes of color and motion in RGB videos, this approach has the potential to fail on facial images with different poses when evaluated on the portrait videos. Also the rPPG technique can be fooled by intentionally changing the skin tone in the postprocessing stage of DeepFake video generation.

In Güera et al., Güera proposed a pipeline which employs a CNN along with a long short term memory (LSTM) network to detect manipulated videos. See David Güera and Edward J. Delp. 2018. Deepfake Video Detection Using Recurrent Neural Networks. In 15*th IEEE International Conference on Advanced Video and Signal Based Surveillance (AVSS)*. IEEE. https://ieeexplore.ieee.org/document/8639163, incorporated herein by reference in its entirety. The CNN backbone is used to extract frame-level features. The manipulated videos possess temporal inconsistencies among video frames that can be detected in a recurrent network. Sabir et al. propose a recurrent convolutional networks to detect manipulated media with different backbones, including ResNet50, DenseNet and bidirectional recurrent network. See Ekraam Sabir, Jiaxin Cheng, Ayush Jaiswal, Wael AbdAlmageed, Iacopo Masi, and Prem Natarajan. 2019. Recurrent Convolutional Strategies for Face Manipulation Detection in Videos. In *Proceedings of the IEEE/CVF Conference on Computer Vision and Pattern Recognition (CVPR) Workshops*. IEEE, 80-87, incorporated herein by reference in its entirety. The DenseNet backbone with face alignment and bidirectional recurrent network achieves the best performance.

Nguyen et al. employ a model based on capsule networks to detect manipulated video. See Huy H. Nguyen, Junichi Yamagishi, and Isao Echizen. 2019. Capsule-Forensics: Using Capsule Networks to Detect Forged Images and Videos. In *IEEE International Conference on Acoustics, Speech and Signal Processing (ICASSP)*. IEEE. https://ieeexplore.ieee.org/document/8682602, incorporated herein by reference in its entirety. The proposed pipeline consists of pre-processing phase, a VGG-19 CNN backbone, capsule network and post processing phase. Nguyen et al. propose a different strategy to detect DeepFake video. See Huy H. Nguyen, Fuming Fang, Junichi Yamagishi, and Isao Echizen. 2019. Multitask Learning For Detecting and Segmenting Manipulated Facial Images and Videos. In *IEEE 10th International Conference on Biometrics Theory, Applications and Systems (BTAS)*. IEEE. https://arxiv.org/abs/1906.06876, incorporated herein by reference in its entirety. They use a multi-task convolutional neural network to detect and locate manipulated facial regions in videos and images. The proposed network comprises of an encoder and a Y-shaped decoder network. The encoder is used for binary classification. By fine-tuning the model on a small amount of data, it can deal with in-the-wild manipulated videos. Mittal et al. propose a multi-modal DeepFake detection method in Mittal. See Trisha Mittal, Uttaran Bhattacharya, Rohan Chandra, Aniket Bera, and Dinesh Manocha. 2020. Emotions Don't Lie: AnAudio-Visual Deepfake Detection Method using Affective Cues. In *Proceedings of the 28th ACM International Conference on Multimedia*. ACM, 2823-2832. https://arxiv.org/abs/2003.06711, incorporated herein by reference in its entirety. They use audio and visual information to train their models. The coherence between audio and visual modalities can be learned by the model. Additionally, the emotions extracted from the facial images are considered when detecting the DeepFake videos. They train the model with triplet loss. Agarwal et al. propose a DeepFake detection system based on behavioral and appearance features. See Shruti Agarwal, Tarek El-Gaaly, Hani Farid, and Ser-Nam Lim. 2020. Detecting Deep-Fake Videos from Appearance and Behavior. *ArXiv* abs/2004.14491 (2020), incorporated herein by reference in its entirety. The behavioral embeddings can be learned using a CNN model by employing a metric-learning loss function. The model is tested on a number of different datasets including FaceForensicss++, DeepFake Detection, DFDC, CelebDF etc. See Rössler et al., Dolhansky et al. and Yuezun Li, Pu Sun, Honggang Qi, and Siwei Lyu. 2020. Celeb-DF: A Large-scale Challenging Dataset for DeepFake Forensics. In *IEEE Conference on Computer Vision and Patten Recognition (CVPR)*. Seattle, WA, United States, each incorporated herein by reference in their entirety. The technique works for the face swapped DeepFake videos, but they have the potential to fail in the detection of DeepFake video that is generated using facial re-enactment and facial attribute manipulation techniques. The existing works focus on CNNs to detect DeepFake video. A limited number of works use the recurrent networks which can process a video as a whole rather than image by image in DeepFake video detection. See Güera et al.; and Sabir et al.

Generalization capability is one factor that is needed to be able to address evolving DeepFake videos. Without generalization, DeepFake detection systems are substantially limited to DeepFake videos at the time of development, requiring constant re-development of DeepFake detection systems. See Polychronis Charitidis, Giorgos Kordopatis-Zilos, Symeon Papadopoulos, and Ioannis Kompatsiaris. 2020. Investigating the Impact of Pre-processing and Prediction Aggregation on the DeepFake Detection Task. *arXiv: Computer Vision and Pattern Recognition* (2020); and Xinsheng Xuan, Bo Peng, Wei Wang, and Jing Dong. 2019. On the generalization of GAN image forensics. In Sun Z., He R., Feng J, Shan S., Guo Z. (eds) *Biometric Recognition. CCBR 2019*. Springer, Cham. https://doi.org/10.1007/978-3-030-31456-9_15, each incorporated herein by reference in their entirety. A wide variety of detection systems employ CNNs and recurrent networks to detect manipulated media. See Afchar et al.; Belhassen Bayar and Matthew C. Stamm. 2016. A deep learning approach to universal image manipulation detection using a new convolutional layer. In *ACM Workshop on Information Hiding and Multimedia Security*. 5-10; Ciftci et al.; Davide Cozzolino, Giovanni Poggi, and Luisa Verdoliva. 2017. Recasting residual-based local descriptors as convolutional neural networks: an application to image forgery detection. In *ACM Workshop on Information Hiding and Multimedia Security*. 1-6; Güera et al.; Li et al.; and Xuan et al., each incorporated herein by reference in their entirety. Li et al. employ CNNs to detect face warping artifacts in images from the DeepFake datasets. See Pavel Korshunov and Sebastien Marcel. 2018. DeepFakes: a New Threat to Face Recognition? Assessment and Detection. *arXiv: Computer Vision and Pattern Recognition* abs/1812.08685 (2018); and Xin Yang, Yuezun Li, and Siwei Lyu. 2019. Exposing Deep Fakes Using Inconsistent Head Poses. In *IEEE International Conference on Acoustics, Speech and Signal Processing (ICASSP)*. 8261-8265. https://doi.org/10.1109/ICASSP.2019.8683164, each incorporated herein by reference in their entirety. The proposed approach in Li et al. works well in cases where there are visible face warping artifacts. See Rössler et al. Most of the DeepFake generation techniques employ post-processing procedures to remove the warping artifacts, which makes it more difficult to detect DeepFake videos. See Luisa Verdoliva. 2020. Media Forensics and DeepFakes: An Overview. *IEEE Journal of Selected Topics in Signal Processing* 14 (2020), 910-932, incorporated herein by reference in its entirety.

Another limitation of the existing approaches is that most of the proposed systems make predictions on the frames in a video and average the predictions in order to get a final prediction score for the whole video. So most proposed systems fail to consider relationships among frames.

It is one object of the present disclosure to describe a system and method that provides generalization capabilities for detection of unseen DeepFake videos. It is another object to describe a system and method that maximizes detection accuracy through taking into account relationships among frames. A further object is to frontalize face images in frames, i.e., align face images with a forward view to capture missing facial information.

SUMMARY

An aspect is a system for detecting DeepFake videos, that can include an input device for inputting a potential Deep-Fake video, the input device inputs a sequence of video frames of the video; processing circuitry that detects faces frame by frame in the video to obtain consecutive face images, creates UV texture maps from the face images, inputs both face images and corresponding UV texture maps, extracts image feature maps, by a convolution neural network (CNN) backbone, from the input face images and corresponding UV texture maps and forms an input data structure, receives the input data structure, by a video transformer model that includes multiple encoders, computes, by the video transformer model, a classification of the video as being Real or Fake; and a display device that plays back the potential DeepFake video and an indication that the video is Real or Fake.

A further aspect is a DeepFake detection system, that can include an artificial intelligence (AI) workstation; a plurality of client computers connected to the AI workstation, wherein the AI workstation includes program instructions which when executed by processing circuitry having multiple processing cores, each processing core performs a method comprising: inputting a sequence of video frames of a video; detecting faces frame by frame in the video to obtain consecutive face images, creating UV texture maps from the face images, inputting both the face images and corresponding said UV texture maps, extracting image feature maps, by a convolution neural network (CNN) backbone, from the face images and corresponding said UV texture maps and forming an input data structure, receiving the input data structure, by a video transformer model that includes multiple encoders, computing, by the video transformer model, a classification of the video as being Real or Fake, and the plurality of client computers each interacting with the AI workstation in parallel to detect whether a video being played in the respective client computer is Real or Fake and display an indication of the detection.

A further aspect is an embedded DeepFake detector that stores program instructions which when executed by processing circuitry having multiple processing cores, each processing core, in parallel with others of the multiple processing cores, performs a method that can include receiving a sequence of video frames of a video captured from a streaming service; detecting faces frame by frame in the video to obtain consecutive face images, creating UV texture maps from the face images, inputting both the face images and corresponding created UV texture maps, extracting image feature maps, by a convolution neural network (CNN) backbone, from the face images and corresponding created UV texture maps and forming an input data structure, receiving the input data structure, by a video transformer model consisting of multiple encoders, computing, by the video transformer model, a classification of the video as being Real or Fake, and performing an action on the video depending on whether the video is detected as being Real or Fake.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
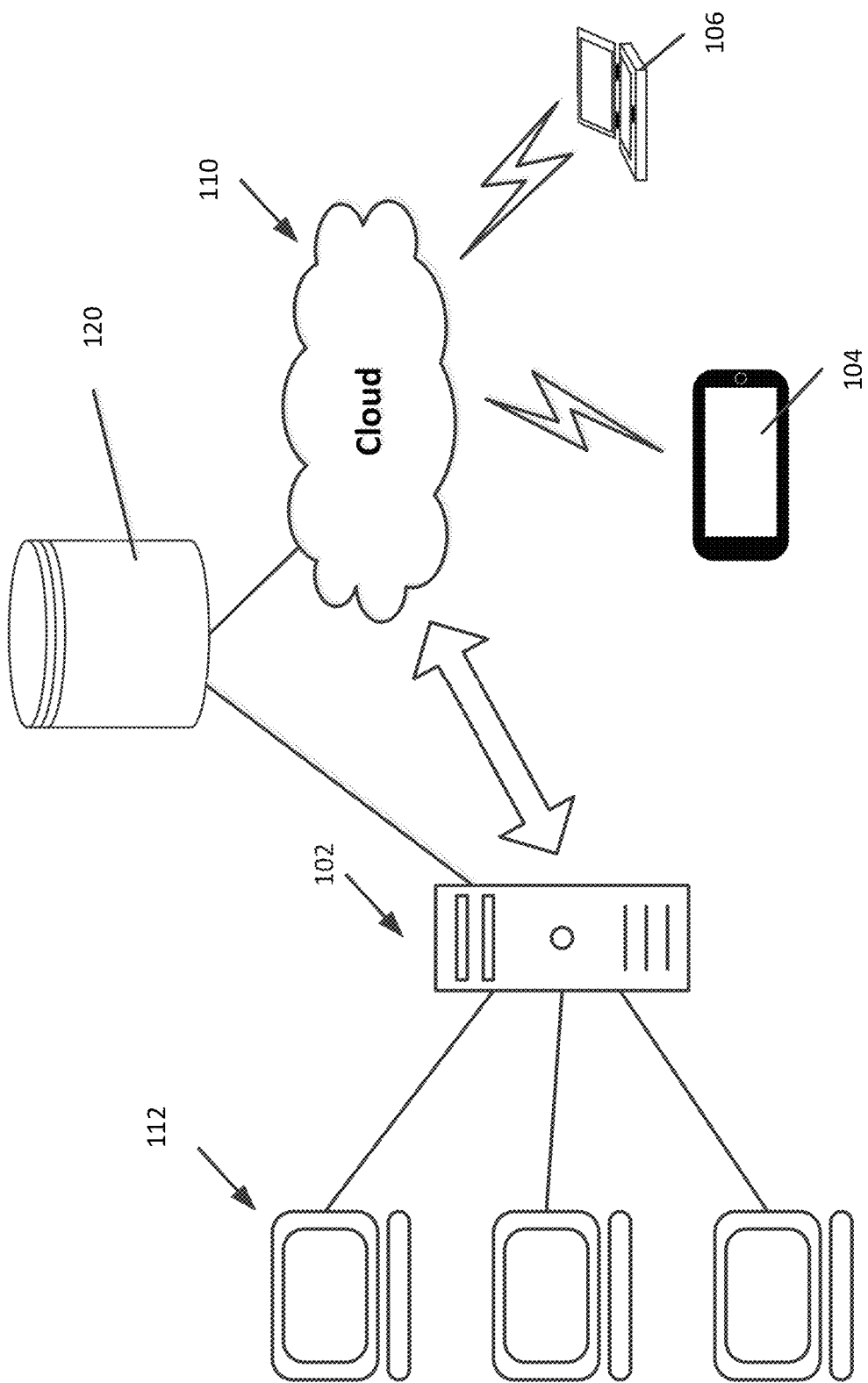
FIG. 1 is a diagram of a machine learning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure provides a solution to the ever-increasing sophistication of DeepFake videos. The solution includes an improvement in classification accuracy over known image transformers while increasing generalization for unseen videos. An aspect is a video transformer that takes into consideration relationships among frames. The relationships are considered through the use of segment embeddings in the transformer. Accuracy of classification is improved through training on aligned facial images and their corresponding UV texture maps. Generalization is improved through the training with incremental learning.

The video transformer extracts features that are more informative for video classification. The improved information is obtained by way of extraction of spatial features that have temporal information. See Oscar de Lima, Sean Franklin, Shreshtha Basu, Blake Karwoski, and Annet George. 2020. Deepfake Detection using Spatiotemporal Convolutional Networks. *arXiv: Computer Vision and Pattern Recognition* abs/2006.14749 (2020); Korshunov et al.; and Sabir et al., each incorporated herein by reference in their entirety. Transformers were first proposed for natural language processing tasks, by Vaswani et al. See Ashish Vaswani, Noam Shazeer, Niki Parmar, Jakob Uszkoreit, Llion Jones, Aidan N Gomez, Łukasz Kaiser, and Illia Polosukhin. 2017. Attention is All you Need. In *Advances in Neural Information Processing Systems*, I. Guyon, U. V. Luxburg, S. Bengio, H. Wallach, R. Fergus, S. Vishwanathan, and R. Garnett (Eds.), Vol. 30. Curran Associates, Inc. https_:// proceedings.neurips.cc/paper/2017/file/ 3f5ee243547dee91fbd053 c1c4a845aa-Paper.pdf, incorporated herein by reference in its entirety. Since then, transformers have shown powerful performance in the natural language processing tasks, for example, machine translation, text classification, question-answering, and natural language understanding. See Myle Ott, Sergey Edunov, David Grangier, and M. Auli. 2018. Scaling Neural Machine Translation. In WMT, incorporated herein by reference in its entirety. Widely used transformer architectures include Bidirectional Encoder Representations from Transformers (BERT), Robustly Optimized BERT Pre-training (RoBERTa), and Generative Pre-trained Transformer (GPT) v1-v3. See Jacob Devlin, Ming-Wei Chang, Kenton Lee, and Kristina Toutanova. 2019. BERT: Pre-training of Deep Bidirectional Transformers for Language Understanding. In *NAACL-HLT*; Yinhan Liu, Myle Ott, Naman Goyal, Jingfei Du, Mandar Joshi, Danqi Chen, Omer Levy, M. Lewis, Luke Zettlemoyer, and Veselin Stoyanov. 2019. RoBERTa: A Robustly Optimized BERT Pretraining Approach. *ArXiv* abs/1907.11692 (2019); Tom B. Brown, Benjamin Mann, Nick Ryder, Melanie Subbiah, et al. 2020. Language Models are Few-Shot Learners. In *Advances in Neural Information Processing Systems*, H. Larochelle, M. Ranzato, R. Hadsell, M. F. Balcan, and H. Lin (Eds.), Vol. 33. Curran Associates, Inc., 1877-1901. https://proceedings.neurips. cc/paper/2020/file/1457c0d6bfcb4967418bfb8ac142f64a-Paper.pdf; Alec Radford and Karthik Narasimhan. 2018. Improving Language Understanding by Generative Pre-Training; and Alec Radford, Jeff Wu, Rewon Child, David Luan, Dario Amodei, and Ilya Sutskever. 2019. Language Models are Unsupervised Multitask Learners. (2019); each incorporated herein by reference in their entirety. Thus, an aspect is a transformer model that can accommodate the video sequences by learning temporal features. See Salman Khan, Muzammal Naseer, Munawar Hayat, Syed Waqas Zamir, Fahad Shahbaz Khan, and Mubarak Shah. 2021. Transformers in Vision: A Survey. arXiv:2101.01169 [cs.CV], incorporated herein by reference in its entirety.

In some methods, to extract more informative features, models have been trained on the aligned facial images and their corresponding UV texture maps. See Hang Dai, Nick Pears, Patrik Huber, and William A P Smith. 2020. 3D Morphable Models: The Face, Ear and Head. In 3*D Imaging, Analysis and Applications*. Springer, 463-512; Hang Dai, Nick Pears, William Smith, and Christian Duncan. 2020. Statistical modeling of craniofacial shape and texture. *International Journal of Computer Vision* 128, 2 (2020), 547-571; and Jianzhu Guo, Xiangyu Zhu, Yang Yang, Fan Yang, Zhen Lei, and Stan Z. Li. 2020. Towards Fast, Accurate and Stable 3D Dense Face Alignment. In *Proceedings of the European Conference on Computer Vision (ECCV)*, each incorporated herein by reference in its entirety. The existing methods use aligned 2D face images. Such an alignment only centralizes the face without considering whether the face is frontalized, i.e., facing towards the camera. When the face is not frontalized, the face part that is not captured by the camera can cause facial information loss and misalignment with the face images that are frontalized. With the UV texture, all face images are aligned into the UV map that is created from the generated 3D faces. Since the generated 3D faces cover all the facial parts, there is substantially no information loss. In a UV map, the facial part for all the faces can be located in the same spatial space. For example, all the nose parts are located in the same region on the UV map. So the faces in UV maps are more consistently aligned.

In some embodiments, to deal with the input combination of face image and UV texture map, the transformer models include learnable segment embeddings in the input data structure. The segment embeddings help the model to distinguish different types of inputs in one data structure. In the embodiment, a segment embedding is a fixed token for face image and a fixed token for UV texture map. There are two vectors in the segment embeddings layer. All tokens belonging to the face image are assigned to a first vector (index 0), whereas all tokens belonging to input 2 are assigned to the second vector (index 1).

Furthermore, an incremental learning strategy is used for fine tuning the models on different datasets incrementally to achieve state-of-the-art performance on new datasets while maintaining the performance on the previous datasets, thus improving generalization. Experimental results on five different public datasets show that the video transformer achieves better performance than other state-of-the-art methods. The segment embedding enables the video transformer to extract more informative temporal features, thereby improving the detection accuracy.

The incremental learning strategy improves the generalization capability of the video transformer. Experiments show that the video transformer model can achieve good performance on a new dataset, while maintaining their performance on previous dataset.

FIG. 1 is a diagram of a machine learning system in accordance with an exemplary aspect of the disclosure. In an exemplary embodiment, a server 102 or artificial intelligence (AI) workstation may be configured for DeepFake recognition. With such a configuration, one or more client computers 112 may be used to perform DeepFake recognition for several videos at a time. In the embodiment, the server 102 may be connected to a cloud service 110. The cloud service 110 may be accessible via the Internet. The cloud service 110 may provide a database system and may serve streaming video. Mobile devices 104, 106 may access video served by the cloud service 110. Viewers of the video served by the cloud service 110 may not realize that they are viewing real or fake videos.

An aspect is a DeepFake video recognition service having one or more servers 102 and one or more client computers 112. The DeepFake video recognition service can determine whether a video is fake and take appropriate action, such as remove a fake video or insert a label that indicates that the video has been detected as being a fake video, so that viewers are aware that a video is fake, or viewers are only provided with real videos.

Another aspect is a DeepFake recognition software application that any user of a display device will be made aware that a video is fake, or may be provided with a list of videos, downloaded, stored, or streamed, that the application has determined to be fake. The DeepFake recognition software application may be configured to run in the background as a daemon, or be configured to be invoked by a command and/or function associated with a graphical widget. In addition, videos that have been determined to be fake may be stored in a database 120 containing fake videos. The database 120 may be maintained in a server computer or in a cloud service 110.

In some embodiments, a video streaming service may include a DeepFake detection system of the present disclosure. The DeepFake detection system may perform an operation of blocking fake videos from being distributed by the streaming service, or other action based on a setup function of the streaming service. The streaming service may be setup to label videos as being fake, store fake videos in a separate distribution channel, "Fake Video Channel" or other action under the discretion of the video streaming service.

In some embodiments, the DeepFake detection system of the present disclosure may take the form of a product, such as a DeepFake detector device or software application. The DeepFake detector device or software application may be connected to a streaming service 110 and may capture video distributed by the streaming service in order to determine if video to be streamed is real or fake. The DeepFake detector device or software application may be incorporated into a network system as middleware that is connected between a video streaming service 110 and an end user display device 104, 106. Videos that are detected as being fake may be subjected to a follow-up action, such as inserting a label into the video as an indication that it has been detected as being fake or real. Another action may be to redirect those videos detected as being fake into a database 120 storing fake videos, for example, to be further analyzed, or separately distributed in a fake video channel. A further action may be to block fake videos from being broadcast by the streaming service.

In some embodiments, a DeepFake detector may be a mobile application that can be installed in a mobile display device 104, 106. The DeepFake detector mobile application may inform the user of the mobile display device that a video is real or fake, by for example, displaying an indication message, or outputting an audio sound or voice message, in order to make the user aware that a video being streamed has been detected as being fake.

Figure 2:
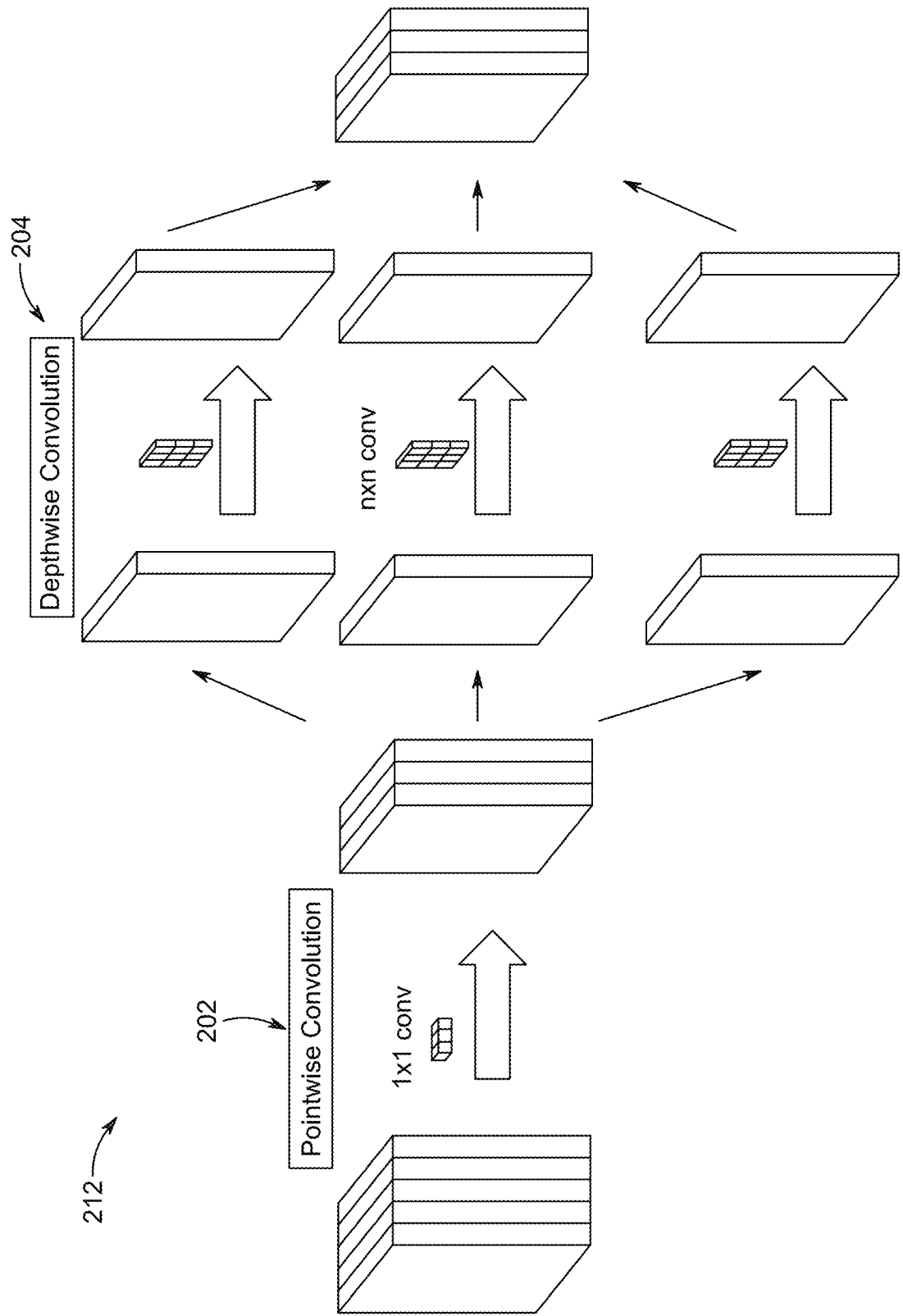
FIG. 2 is a block diagram of a depthwise separable convolutional neural network.

A convolution neural network is typically used for image recognition, and one example is the Xception network. Xception has been arranged as a depthwise separable convolutional network. FIG. 2 is a block diagram of a depthwise separable convolutional neural network. A depthwise separable convolution, commonly called "separable convolution" in deep learning frameworks such as TensorFlow and Keras, consists in a depthwise convolution, i.e. a spatial convolution performed independently over each channel of an input, and a pointwise convolution, i.e. a 1×1 convolution. In Xception, the pointwise convolution is followed by a depthwise convolution.

Depthwise separable convolutions implemented (e.g. in TensorFlow) first performs the 1×1 convolution first. In Inception, both operations are followed by a ReLU non-linearity, however depthwise. separable convolutions are usually implemented without nonlinearities.

The basic building block of a transformer is the multi-head self-attention mechanism. See Vaswani et al. The self-attention mechanism is responsible for learning the relationship among the elements of input sequence. Transformer architectures can accommodate the full-length input sequences in a parallel manner and learn the dependency among frames. The transformer models can also be scaled to extremely complex models on large-scale datasets.

In the natural language processing tasks e.g., text classification, machine translation, question answering, transformers have achieved state-of-the-art performance, including BERT, RoBERT and GPTv1-3. See Devlin et al.; Liu et al.; Brown et al.; Alec Radford, Luke Metz, and Soumith Chintala. 2016. Unsupervised Representation Learning with Deep Convolutional Generative Adversarial Networks. *CoRR* abs/1511.06434 (2016); and Radford et al. (2018), each incorporated herein by reference in their entirety. BERT-large model which had 340 million parameters was beaten by a considerable margin by the GPT-3 model which had 175 billion parameters. See Brown et al. At present, the state-of-the-art Switch transformer can scale up to a gigantic 1.6 trillion parameters. See William Fedus, Barret Zoph, and Noam Shazeer. 2021. Switch Transformers: Scaling to Trillion Parameter Models with Simple and Efficient Sparsity. *ArXiv* abs/2101.03961 (2021), incorporated herein by reference in its entirety. Inspired by the success of Transformers in NLP tasks, switch transformer models were considered for vision and multi-modal vision-language tasks.

A large number of transformer based models have been used to deal with the vision tasks, such as image classification, object detection, image segmentation, image captioning, video classification, and visual question answering. See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. 2020. An Image is Worth 16×16 Words: Transformers for Image Recognition at Scale. arXiv:2010.11929 [cs.CV]; Nicolas Carion, Francisco Massa, Gabriel Synnaeve, Nicolas Usunier, Alexander Kirillov, and Sergey Zagoruyko. 2020. End-to-End Object Detection with Transformers. *ArXiv* abs/2005.12872 (2020); Hugo Touvron, Matthieu Cord, Matthij s Douze, Francisco Massa, Alexandre Sablayrolles, and Hervé Jégou. 2020. Training data-efficient image transformers & distillation through attention. *ArXiv* abs/2012.12877 (2020); Jiasen Lu, Dhruv Batra, Devi Parikh, and Stefan Lee. 2019. ViLBERT: Pretraining Task-Agnostic Visiolinguistic Representations for Vision-and-Language Tasks. In *Advances in Neural Information Processing Systems*; Rohit Girdhar, João Carreira, Carl Doersch, and Andrew Zisserman. 2019. Video Action Transformer Network. *IEEE/CVF Conference on Computer Vision and Pattern Recognition (CVPR)* (2019), 244-253; Chen Sun, Austin Myers, Carl Vondrick, Kevin Murphy, and Cordelia Schmid. 2019. VideoBERT: A Joint Model for Video and Language Representation Learning. *IEEE/CVF International Conference on Computer Vision (ICCV)* (2019), 7463-7472; Yen-Chun Chen, Linjie Li, Licheng Yu, Ahmed El Kholy, Faisal Ahmed, Zhe Gan, Yu Cheng, and Jingjing Liu. 2020. UNITER: UNiversal Image-TExt Representation Learning. In *Proceedings of European Conference on Computer Vision (ECCV)*; Lu et al; and Di Qi, Lin Su, Jia Song, Edward Cui, Taroon Bharti, and Arun Sacheti. 2020. Image-BERT: Cross-modal Pre-training with Large-scale Weakly-supervised Image-Text Data. *ArXiv* abs/2001.07966 (2020), each incorporated herein by reference in their entirety. The transformer based models achieve state-of-the-art performance in the vision tasks. However, the self-attention operation of the transformer architecture scales quadratically, which becomes enormously expensive as the length of the input sequence increases. A number of more efficient transformer architectures have been used to address this issue. See Iz Beltagy, Matthew E. Peters, and Arman Cohan. 2020. Longformer: The Long-Document Transformer. *ArXiv* abs/2004.05150 (2020); Hang Dai, Shujie Luo, Yong Ding, and Ling Shao. 2020. Commands for autonomous vehicles by progressively stacking visual-linguistic representations. In *European Conference on Computer Vision*. Springer, 27-32; Shujie Luo, Hang Dai, Ling Shao, and Yong Ding. 2020. C4AV: Learning Cross-Modal Representations from Transformers. In *European Conference on Computer Vision*. Springer, 33-38; Touvron et al.; and Sinong Wang, Belinda Z. Li, Madian Khabsa, Han Fang, and Hao Ma. 2020. Linformer: Self-Attention with Linear Complexity. *ArXiv* abs/2006.04768 (2020), each incorporated herein by reference in their entirety. Specifically, there are several efficient transformer based methods to achieve state-of-the-art performance in image classification tasks. However, few transformer models have addressed video classification.

Figure 3:
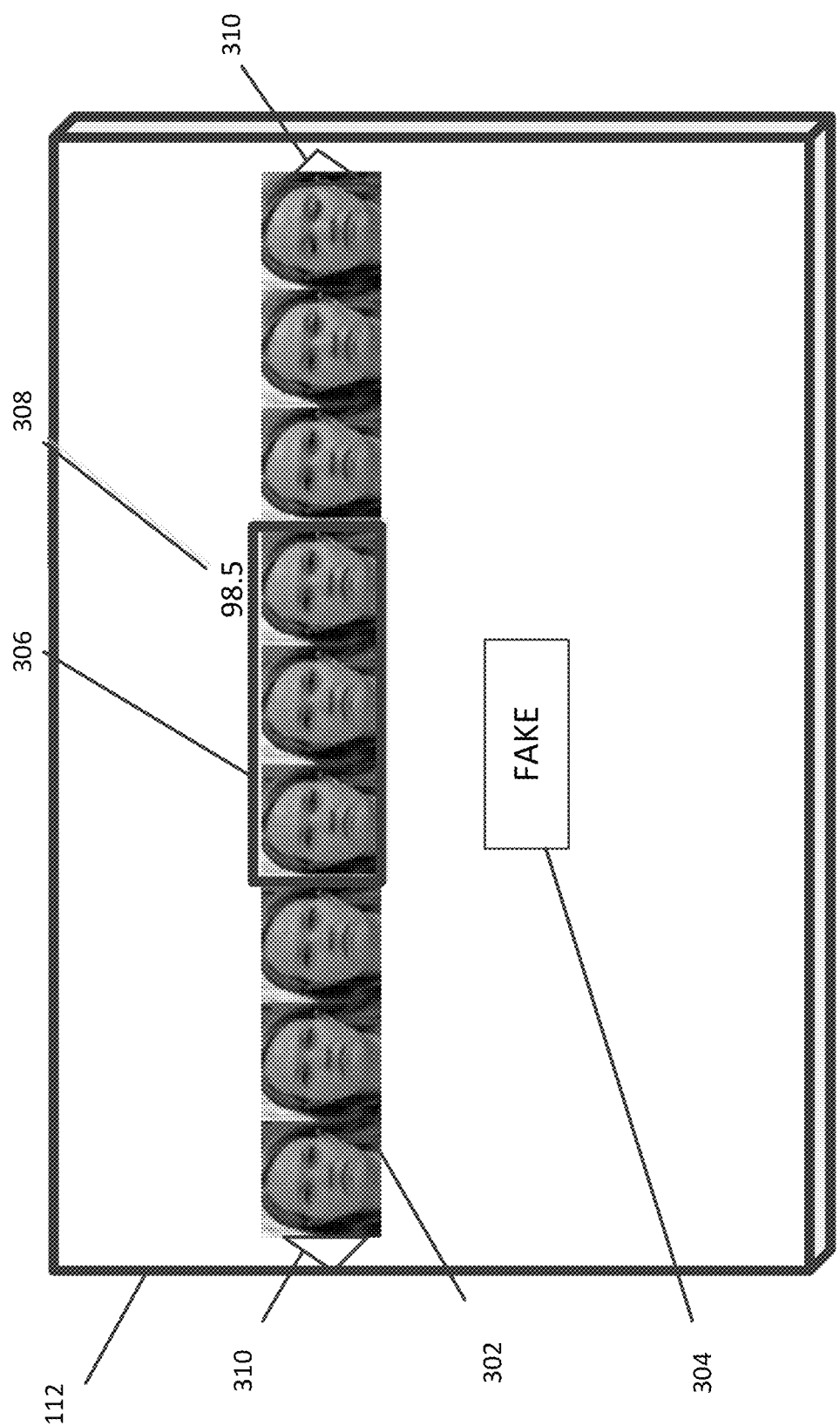
FIG. 3 illustrates a user interface for DeepFake detection in accordance with an exemplary aspect of the disclosure.
Figure 4:
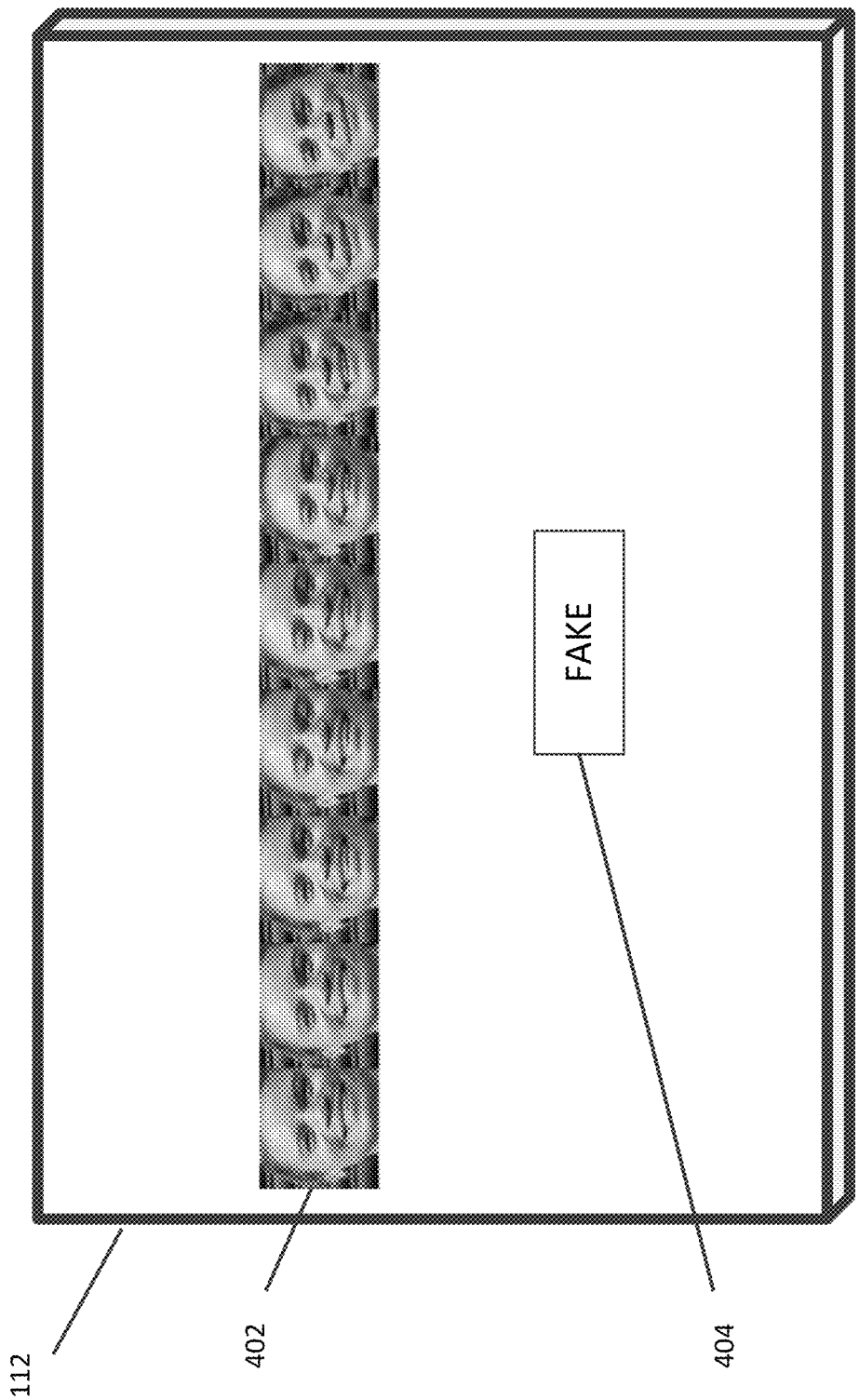
FIG. 4 illustrates a user interface for DeepFake detection in accordance with another exemplary aspect of the disclosure.

Unlike still images, videos contain a sequence of frames. An aspect is to determine whether a sequence of frames in a video is fake or real. In some videos, it is possible that only specific sequences of frames may have been modified with fake images. It should be understood that normal video production involves modifying/editing videos to enhance or replace backgrounds, perform graphic editing functions to incorporate object motion, and other graphics functions. DeepFake on the other hand, involves modifying/replacing face images in an original video. Recognizing the distinction between edited videos during normal video production and videos that have had face images modified or replaced is a task of DeepFake video detection. FIG. 3 is a user interface screen showing example frames of a video. The video transformer classifies the video as "Fake," and may display an indication of whether the frames 302 are fake or real 304. The user interface 112 may enable display of a number of frames 302 at a time. The number of frames is fixed based on the screen size or width of a window in the display screen. The frames 302 may be scrolled left or right to display another set of frames, for example by clicking on an arrow 310. In some embodiments, the video transformer may detect one or more of a subset of frames that it has determined to be fake, and provide an indicator to show the frame(s) deemed to be fake. The indicator may be a highlight 306 around the perimeter of the frame(s). In some embodiments, the user interface 112 may also include a score 308 representing a probability that a frame(s) is fake. FIG. 4 is a user interface screen showing another example of frames 402 of a video. The display shows an indication 404 that the video transformer classifies the video as "Fake."

Figure 5:
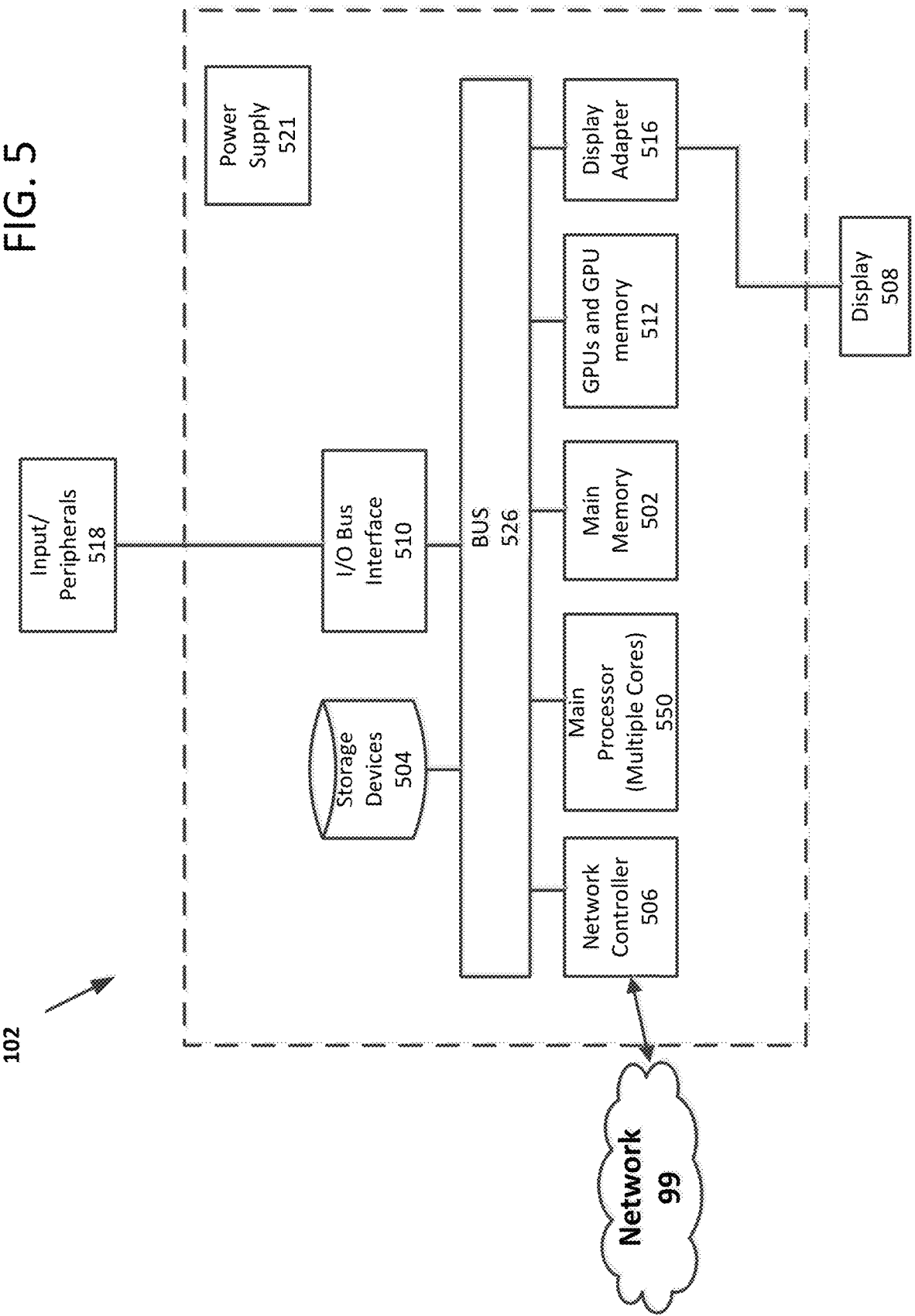
FIG. 5 is block diagram of a workgroup server for machine learning.

FIG. 5 is a block diagram illustrating an example computer system for implementing the machine learning training and inference methods according to an exemplary aspect of the disclosure. The computer system may be an AI workstation or server 102 running a server operating system, for example Ubuntu Linux OS, Windows Server, a version of Unix OS, or Mac OS Server. The computer system 102 may include one or more central processing units (CPU) 550 having multiple cores. The computer system 500 may include a graphics board 512 having multiple GPUs, each GPU having GPU memory. The graphics board 512 may perform many of the operations of the disclosed machine learning methods in parallel. The computer system 500 includes main memory 502, typically random access memory RAM, which contains the software being executed by the processing cores 550 and GPUs 512, as well as a non-volatile storage device 504 for storing data and the software programs. Several interfaces for interacting with the computer system 500 may be provided, including an I/O Bus Interface 510, Input/Peripherals 518 such as a keyboard, touch pad, mouse, Display Adapter 516 and one or more Displays 508, and a Network Controller 506 to enable wired or wireless communication through a network 99. The interfaces, memory and processors may communicate over the system bus 526. The computer system 500 includes a power supply 521, which may be a redundant power supply.

In some embodiments, the computer system 102 may include a server CPU and a graphics card by NVIDIA, in which the GPUs have multiple CUDA cores.

The machine learning training and inference method includes a backbone to extract image features as well as a video transformer model. The video transformer model is trained using an incremental learning strategy. Inspired by Vision Transformer, the high level image features are more informative than the image patches. See Dosovitskiy et al. Thus, the video transformer model employs a pre-trained CNN backbone to extract image features. It has been determined that XceptionNet achieves better performance than other backbone networks in DeepFake detection. Thus, embodiments use XceptionNet as the image feature extractor. See Chollet; and Ross Wightman. 2019. PyTorch Image Models. https://github.com/rwightman/pytorch-image-models. https://doi.org/10.5281/zenodo.4414861, each incorporated herein by reference in their entirety.

Figure 6:
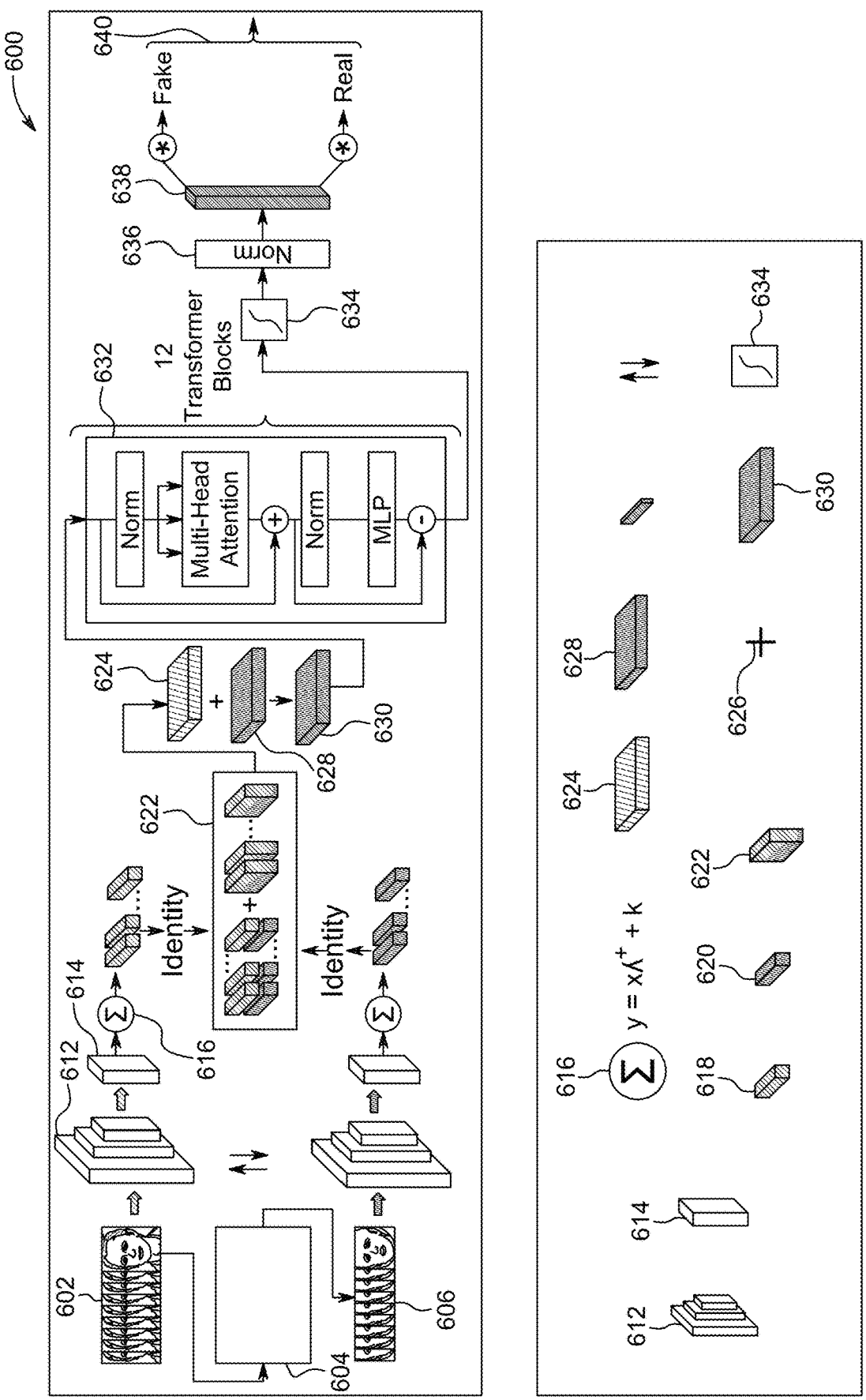
FIG. 6 is a block diagram for an architecture of a video transformer in accordance with an exemplary aspect of the disclosure.

FIG. 6 illustrates the architecture of the video transformer for DeepFake detection. Although the figure is described as showing a video transformer, the video transformer includes image preprocessing, a backbone, as well as a video transformer section. As part of preprocessing, the transformer architecture 600 employs a Single Stage Detector (SSD) to detect and crop faces 602 frame by frame. See Gary Bradski. 2000. The OpenCV Library. *Dr. Dobb's Journal of Software Tools* (2000), incorporated herein by reference in its entirety. The transformer architecture 600 uses 3D Dense Face Alignment (3DDFA) model 604 to generate UV texture maps 606 from the detected face images. See Jianzhu Guo, Xiangyu Zhu, and Zhen Lei. 2018. 3DDFA. https://github.com/cleardusk/3DDFA; and Guo et al. (2020), each incorporated herein by reference in their entirety. The transformer architecture 600 uses both face images 602 and their UV texture maps 606 in the extraction of the image features. Known methods use aligned 2D face images. However, alignment of 2D face images only centralizes the face without considering whether the face is frontalized, i.e., facing forward towards a camera. When the face is not frontalized, a face part that is not captured by the camera can cause facial information loss and misalignment with the face images that are frontalized. On the other hand, in the case of the UV texture, all face images are aligned into the UV map that is created from generated 3D faces. Since the generated 3D faces cover all the facial parts, there is substantially reduced information loss. In UV map, the facial part for all the faces can be located in the same spatial space. In addition, the aligned face image can also provide pose, eyes blink and mouth movement information that cannot be perceived in the UV texture image, so both face images and their UV texture maps are used to extract the image features.

To learn the intra-frame dependencies, the transformer architecture 600 is trained on a sequence of the cropped facial images 602 with their UV texture maps 606. In some embodiments, the pre-trained XceptionNet 612 is employed to extract feature maps from face images 602 and the UV texture maps 606. After getting the feature maps of each face image frame and the corresponding UV texture map, the feature vectors are re-shaped using a 2D convolution layer 614 and a linear layer to accommodate the input dimension of video transformer 630.

In the video transformer architecture 600, the property of parallel input processing is exploited, which is inherent in the transformer models. The transformer networks can learn to detect the intra-frame discrepancies, such as flickering, blurry frames, and mouth movement. See Güera et al.; and Sabir et al. A single face frame and UV texture map that are input to the XceptionNet backbone can be represented as:

$$f \in \mathbb{R}\frac{N}{2T} \times D \quad (1)$$

$$u \in \mathbb{R}\left(\frac{N}{2T}\right) \times D \quad (2)$$

where f represents face feature vector, and u represents UV texture map feature vector, N represents the total number of patches. In one embodiment, for facial image and UV texture map, N is 576, while N is 324 for facial image only. T represents the number of input frames and D represents the constant latent vector dimension. Each face image frame is concatenated with the corresponding UV texture map into concatenated feature vector 624:

$$(f, u) \in \mathbb{R}^{\left(\frac{N}{T}\right) \times D} \quad (3)$$

In some embodiments, a one dimensional learnable segment embedding is used to help distinguish different types of inputs in the input data structure. The segment embeddings 622 are included as part of the feature vector which results from the fusion of facial images and their corresponding UV texture map feature vectors as obtained in Equation 3. The segment embeddings 622 can be defined as:

$$E_{seg} \in \mathbb{R}^{\left(\frac{N}{T}\right) \times D} \quad (4)$$

The input feature vector 624 to the transformer can be extracted from the concatenation of the facial frame and its corresponding UV map:

$$\text{frame}_i = \left[\left(\left(\text{face}_0 \ldots \text{face}_{\frac{N}{2T}}\right), \left(uV_0 \ldots uv_{\frac{N}{2T}}\right)\right) \times D\right] + E_{seg} - \text{face-}uv_{\frac{N}{T}} \quad (5)$$

where N=576, T=9 and D=768.

A learnable positional embedding 628 is then added to the whole input feature vector:

$$E_{pos} \in \mathbb{R}^{(N+1) \times D} \quad (6)$$

The video transformer architecture 600 consists of 12 encoders 632, where each encoder 632 includes a multi-head self-attention layer, two Norm layers and a Multi-Layer Perceptron (MLP).

The encoders 632 feed their output to a tan-h activation function 634, and normalization function 636, and then to a fully connected layer 638, to provide a final output 640 of a classification result, either "Fake" or "Real".

Figure 7:
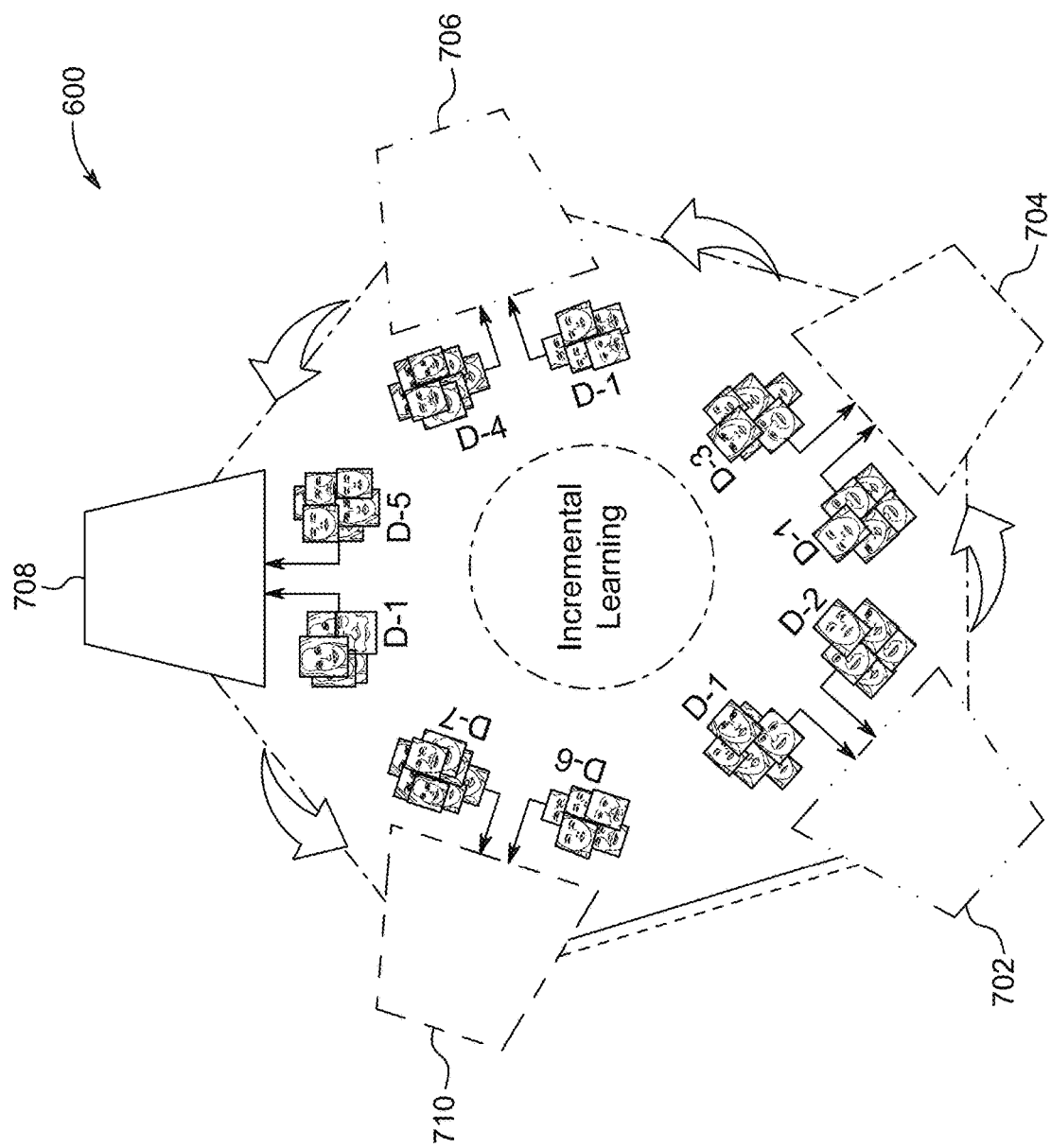
FIG. 7 illustrates incremental learning in accordance with an exemplary aspect of the disclosure.

The video transformer architecture 600 is trained using a deep learning algorithm, i.e., an algorithm that can be used to train a network having an architecture having multiple layers without problems such as vanishing gradient. In one embodiment, an incremental learning strategy is used to fine-tune a pretrained transformer model on new datasets, without sacrificing its performance on previous datasets. FIG. 7 illustrates incremental learning in accordance with an exemplary aspect of the disclosure. D1 represents the real data used to train the models. D2 comprises of FaceSwap and Deepfakes datasets. D3 represents the Face2Face dataset and D4 represents Neural Textures dataset. D5 and D6 represents DFDC dataset and D7 represents DeepFake Detection (DFD) dataset. The loss function in the incremental learning consists of two parts: one part that measures the similarity between the weights from a new dataset and the old weights from the previous dataset, and the other one is to measure the accuracy of the training model on the new dataset. See Francisco M Castro, Manuel J Marin-Jiménez, Nicolás Guil, Cordelia Schmid, and Karteek Alahari. 2018. End-to-end incremental learning. In *Proceedings of the European conference on computer vision (ECCV)*. 233-248, incorporated herein by reference in its entirety. The former one forces the weights to be as similar as possible to the old weights, so it still performs well on the previous dataset. And the latter one guarantees that the model performs well on the new dataset.

The incremental learning first trains (702) the video transformer model on FaceSwap and Deepfakes subsets (D2) in FaceForensics++ dataset that are generated using faceswap technique. See Rössler et al. Then (704, 706) the model is fine-tuned on the other two subsets of the Face-Forensics++ dataset, Face2Face (D3) and Neural Textures (D4), which are generated by a different technique called facial re-enactment. See Rössler et al. To show the performance on unseen dataset, the model is also fine-tuned on DFDC dataset (D5, D6) and DeepFake Detection (DFD) dataset (D7). See Dolhansky et al.; and Rössler et al. The model is trained with segment embeddings on 280 k images from FaceSwap and Deepfakes subsets (D2) of FaceForensics++ dataset. The trained model is fine-tuned on only 2,500 images from the Face2Face subset (D3) which are 0.05% of the Face2Face subset. The trained model is finetuned on 2,500 images from Neural Textures subset (D4). Then the trained model is fine-tuned from the previous step on 2,500 images from DFD dataset (D7). See Rössler et al. Finally, the trained model is fine-tuned on 6,000 DFDC images (D5, D6), which are also of the DFDC dataset. See Dolhansky et al.

Example Implementations

In order to evaluate the video transformer architecture, example implementations have been trained and evaluated on a public DeepFake detection benchmark, FaceForensics++. See Rössler et al. The FaceForensics++ dataset includes four different subsets: (1) FaceSwap, (2) Deepfakes, (3) Face2Face and (4) Neural Textures. The first two subsets contain videos generated by the face swapping techniques, whereas the other two subsets are generated by the facial re-enactment techniques. There are 1,000 videos in each subset. The FaceForensics++ benchmark also contains 1,000 real videos. 720 videos were used from each subset for training and 140 videos for validation and 140 videos for testing. The FaceForensics++ dataset contains around 1.7 million frames. FaceSwap and Deepfakes subsets are used for model training by employing only 280 k frames for training. These models are further fine-tuned on Face2Face and Neural Textures subsets. The trained models are also fine-tuned on DFDC dataset and DFD dataset. See Dolhansky et al.; and Rössler et al. Table 1 shows the exact number of frames used to train and fine-tune the models from each dataset.

TABLE 1

| Dataset | Training | Validation | Test |
|---|---|---|---|
| Prestine | 138000 | 27600 | 1400 |
| FaceSwap | 69000 | 13800 | 1400 |
| Deepfakes | 69000 | 13800 | 1400 |
| Face2Face | 2500 | 500 | 1400 |
| Neural Textures | 2500 | 500 | 1400 |
| DFDC | 6000 | 1200 | 3500 |
| DFD | 2500 | 500 | 1400 |

For face detection, a Single Shot Detector (SSD) was deployed with ResNet as a backbone. 3DDFA-V2 (604) was deployed to generate UV texture maps (606). See Guo et al; Guo et al. (2020); and Hang Dai, Nick Pears, William A P Smith, and Christian Duncan. 2017. A 3d morphable model of craniofacial shape and texture variation. In *Proceedings of the IEEE International Conference on Computer Vision*. 3085-3093, each incorporated herein by reference in their entirety. XceptionNet (612) was used for image feature extraction. See Chollet et al. A transformer architecture was deployed, including 12 transformer layers. See Dosovitskiy et al. [FIG. 8] [FIG. 9]

Figure 8:
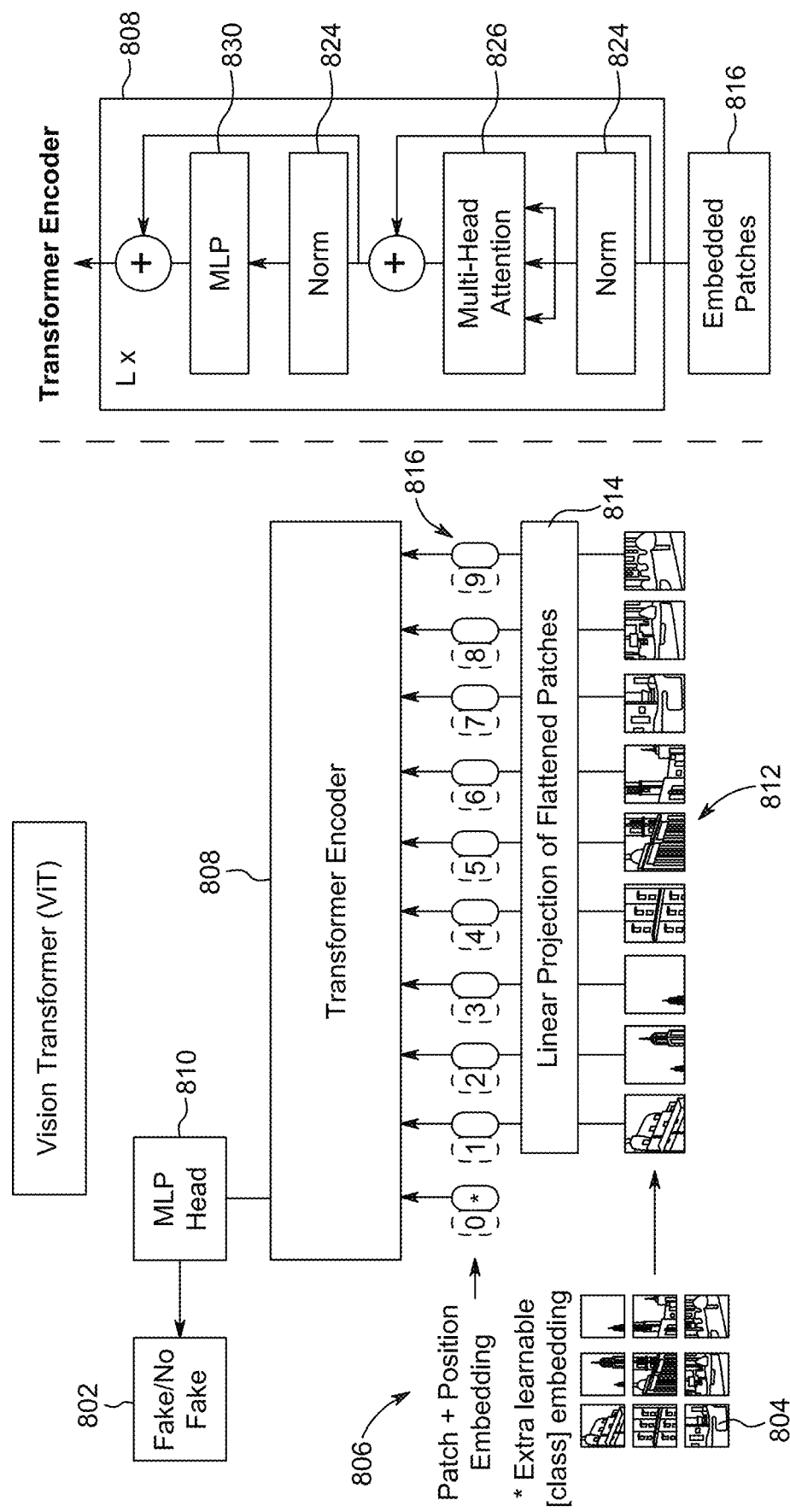
FIG. 8 is a block diagram of an image transformer for the architecture of FIG. 6.

FIG. 8 is a block diagram of an image transformer for the architecture of FIG. 6. The image Transformer 800 receives as input a 1D sequence of token embeddings 816. To handle 2D images, the image $x \in R^{H \times W \times C}$ (804, 812) is reshaped into a sequence of flattened 2D patches (814) $x_p \in R^{N \times (P^2 \cdot C)}$, where (H, W) is the resolution of the original image, C is the number of channels, (P, P) is the resolution of each image patch, and $N = HW/P^2$ is the resulting number of patches, which also serves as the effective input sequence length for the Transformer. The image Transformer 800 uses constant latent vector size D through all of its layers, the patches are flattened and mapped to D dimensions with a trainable linear projection. The output of this projection is referred to as the patch embeddings 806.

Similar to BERT's [class] token (class embedding), a learnable embedding to the sequence of embedded patches 806 ($z_0^0 = x_{class}$) is prepared, whose state at the output of the Transformer encoder ($z_L^0$) serves as the image representation y. Both during pre-training and fine-tuning, a classification head (*) is attached to $z_L^0$. The classification head is implemented by a MLP with one hidden layer at pre-training time and by a single linear layer at fine-tuning time.

Position embeddings are added to the patch embeddings 806 to retain positional information. 1-D positional embedding encodes the input patches as a sequence of patches in the original raster order. Learnable 1D position embeddings are used, since significant performance gains have not been observed from using more advanced 2D-aware position embeddings. The resulting sequence of embedding vectors 816 serves as input to the transformer encoder 808.

The Transformer encoder (808) consists of alternating layers of multiheaded self-attention (MSA) (826) and MLP blocks (830). Layer norm (824) is applied before every block, and residual connections after every block. Regarding self-attention, sstandard qkv self-attention (SA) is one building block for neural architectures. For each element in an input sequence $z \in R^{N \times D}$, a weighted sum is computed over all values v in the sequence. The attention weights $A_{ij}$ are based on the pairwise similarity between two elements of the sequence and their respective query $q^i$ and key $k^j$ representations. Multihead self-attention (MSA) is an extension of SA in which k self-attention operations are run, called "heads", in parallel, and project their concatenated outputs.

Figure 9:
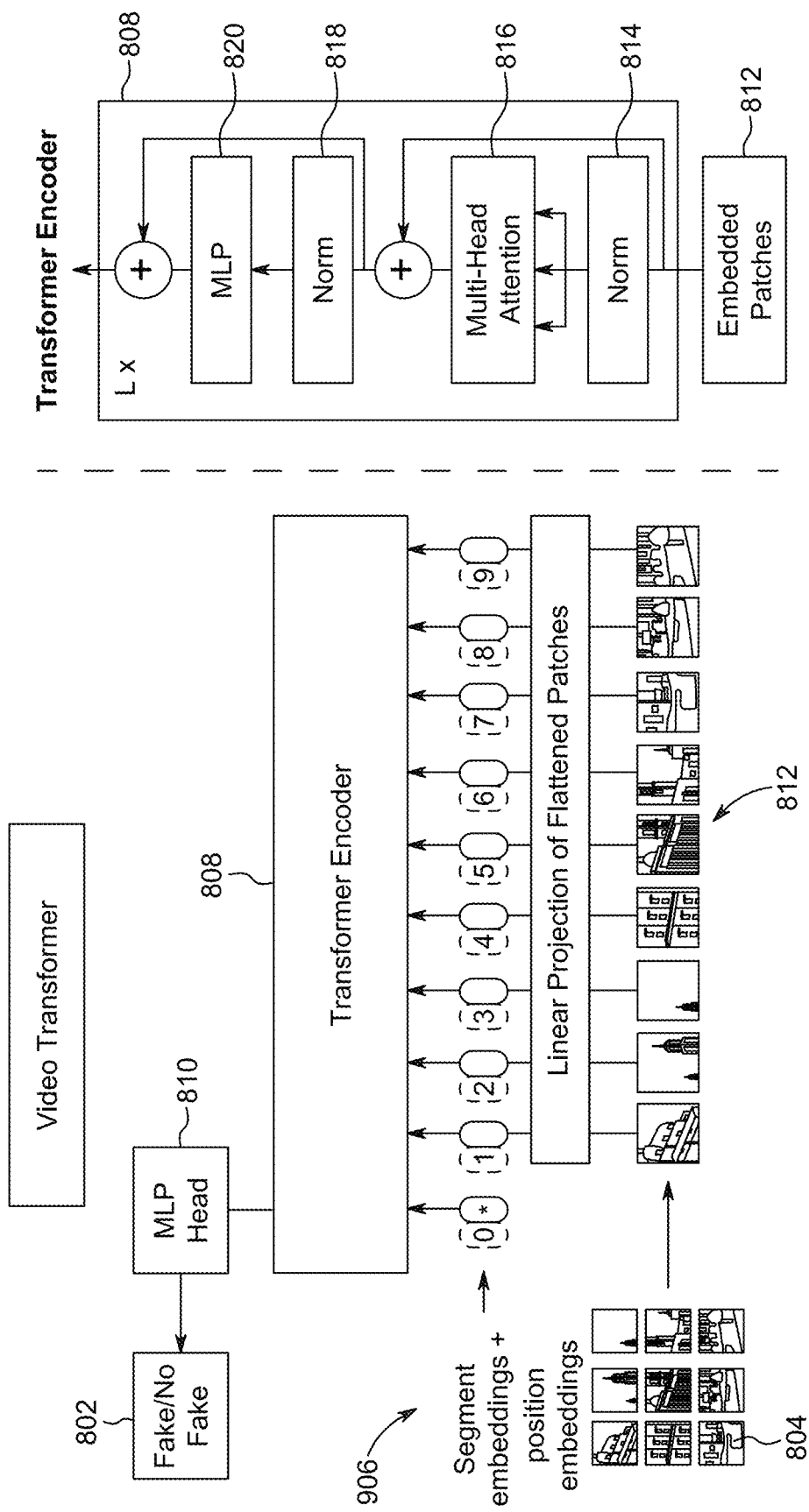
FIG. 9 is a block diagram of a video transformer for the architecture of FIG. 6 in accordance with an exemplary aspect of the disclosure.

FIG. 9 is a block diagram of a video transformer for the architecture of FIG. 6 in accordance with an exemplary aspect of the disclosure. The Vision Transformer (ViT) (632) base architecture was modified for the Video Transformer by adding the learnable segment embeddings 906 to the input data structure. See Luke Melas. 2020. PyTorch Pretrained ViT. https://github.com/lukemelas/PyTorch-Pretrained-ViT, incorporated herein by reference in its entirety. The learnable segment embeddings enable the learning of the visual details in image frames with temporal information.

The raw input size of the images fed to the video transformer model is [3, 299, 299]. This size is used to make other inputs compatible to the backbone network XceptionNet that is used for image feature extraction in hybrid models. After extracting image features through XceptionNet, a feature vector of dimension [2048, 10, 10] is obtained, then this feature vector is passed to a 2D convolutional layer and a linear layer, which gives us a feature vector of dimension [1, 32, 768]. After the two reshaped feature vectors are obtained for facial images and UV texture maps, these two feature vectors are concatenated and a feature vector of dimension [1, 64, 768] is obtained. A one dimensional learnable segment embedding is added to the feature vector as [1, 64, 768]. This is done for all the sequence frames and these frames are concatenated as [1, 576, 768]. The learnable positional embeddings are added to the feature vector and a [class] token is added at the beginning of the feature vector. The final feature vector [1, 577, 768] is used as the input to the proposed video transformer model. All models are trained for 5 epochs, with a learning rate of 3×10−3. SGD is used as the optimizer, and CrossEntropyLoss is used as the loss function.

Ablation Study

An ablation study with different experimental settings to show the effectiveness of the proposed modules. The models are trained with 8 different configurations:

(1) Patch embedding transformer trained on face images only
(2) Patch embedding transformer trained on face and UV textures without segment embeddings
(3) Patch embedding transformer trained on face and UV textures with segment embeddings
(4) Hybrid image transformer trained on face images only
(5) Hybrid transformer trained on face and UV textures without segment embeddings
(6) Hybrid transformer trained on face and UV textures with segment embeddings
(7) Hybrid video transformer trained on 9 frames (face+UV texture maps) without segment embeddings
(8) Hybrid video transformer trained on 9 frames (face+UV texture maps) with segment embeddings The listed models are trained and evaluated on 2 subsets of FaceForensics++ dataset: FaceSwap and Deepfakes. The models are trained on around 280 k images. The performance comparison is shown in Table 2.

TABLE 2

| | FaceForensics++ | | |
|---|---|---|---|
| Models | AUC | F1-Score | Accuracy |
| Patch Img Only | 74.39% | 65.88% | 72.31% |
| Patch UV Img | 66.48% | 56.79% | 66.58% |
| Patch SE UV Img | 77.10% | 68.71% | 73.26% |
| Hyb Img Only | 98.03% | 96.19% | 97.37% |
| Hyb UV Img | 98.57% | 97.20% | 98.09% |
| Hyb SE Img | 99.28% | 98.92% | 99.28% |

TABLE 2-continued

| FaceForensics++ | | | |
|---|---|---|---|
| Models | AUC | F1-Score | Accuracy |
| Video | 98.74% | 97.54% | 98.32% |
| Video SE | 99.64% | 99.28% | 99.52% |

Patch embedding transformer trained on face images only. The patch embedding based models are trained on 2D image patches. The first model is trained on face images only, and no UV texture maps. The input image is reshaped into 2D patches as xinput=f+E, f represents the reshaped face frame image. N refers to the number of patches, which is 324 in our case. D represents the constant latent vector dimension, which is 768 in our model. After adding a BERT styled [class] token at the beginning of our input, the dimension of the input feature vector is [1, 325, 768].

Patch embedding transformer trained on face and UV textures without segment embeddings. This model is trained on 2D patches of facial images and the UV texture maps without adding the learnable segment embeddings to the input data structure. The positional embeddings are used, so that this model is compared to the model with both the positional embeddings and the segment embeddings. As illustrated in the first model and the second model of Table 2, it shows that the UV texture map provides useful information for DeepFake detection in the patch embedding transformer models.

Patch embedding transformer trained on face and UV textures with segment embeddings. One dimensional learnable segment embeddings with positional embeddings is added to train this model. The purpose of adding segment embeddings is to help model distinguish the face image patches and the UV texture map patches. As shown in the second model and the third model of Table 2, it can be seen that the model trained with the segment embeddings performs better than the model trained without segment embeddings. This implies that the proposed segment embeddings help enhance the feature learning, thereby improving the detection performance.

Hybrid image transformer trained on face images only. The hybrid image transformer model is trained on image features extracted from face image only using the XceptionNet backbone. As can be seen from Table 2, the hybrid model outperforms the patch embedding based model. So the image feature backbone is necessary in the transform based DeepFake detection model.

Hybrid transformer trained on face and UV textures without segment embeddings. Hybrid transformer model for face images and UV texture maps is trained without the learnable segment embeddings. The results in Table 2 show that the UV texture map provides useful information for DeepFake detection in the hybrid transformer models. This lies in the fact that the UV texture map is losslessly better aligned than the aligned face image. The aligned face image also provides pose, eyes blink and mouth movement information that cannot be prevented in the UV texture image.

Hybrid transformer trained on face and UV textures with segment embeddings. This hybrid image transformer model is trained using segment embeddings. The hybrid image transformer model is compared with and without the segment embeddings as shown in Table 2, it can be seen that the model trained with the segment embeddings performs better than the model trained without the segment embeddings. So the segment embeddings help the model distinguish the two different types of the input data, thereby enhancing the feature learning in the transformer.

Hybrid video transformer trained on facial image frames (face+UV texture maps) without segment embeddings. The structure of the video based transformer model is different from the image only based transformer models as described above. The video based models are fed with the consecutive face images and their corresponding UV texture maps. The video transformer model is trained on the face image frames and their corresponding UV texture maps without adding the segment embeddings. Only the positional embeddings are added to the input sequence of the face frames and their corresponding UV maps. The video transformer performs better compared to the image only based transformer model without the segment embeddings.

Hybrid video transformer trained on facial image frames (face+UV texture maps) with segment embeddings. The hybrid video transformer achieves the best performance among all the experimental settings. This model is trained on the consecutive face image frames along with their corresponding UV texture maps. Both the segment embeddings and the positional embeddings are added to the input data structure. Separate embeddings are added to each of the input face frames and each of the corresponding UV texture maps. It helps the video transformer model to discriminate the input frames and achieve better performance as shown in Table 2. FIGS. 3 and 4 above show frames of two example DeepFake videos from DeepFake Detection (DFD) dataset. The image transformer model classifies the videos as "Real", while the video transformer correctly classifies both videos as "Fake."

Incremental Learning

Figure 10:
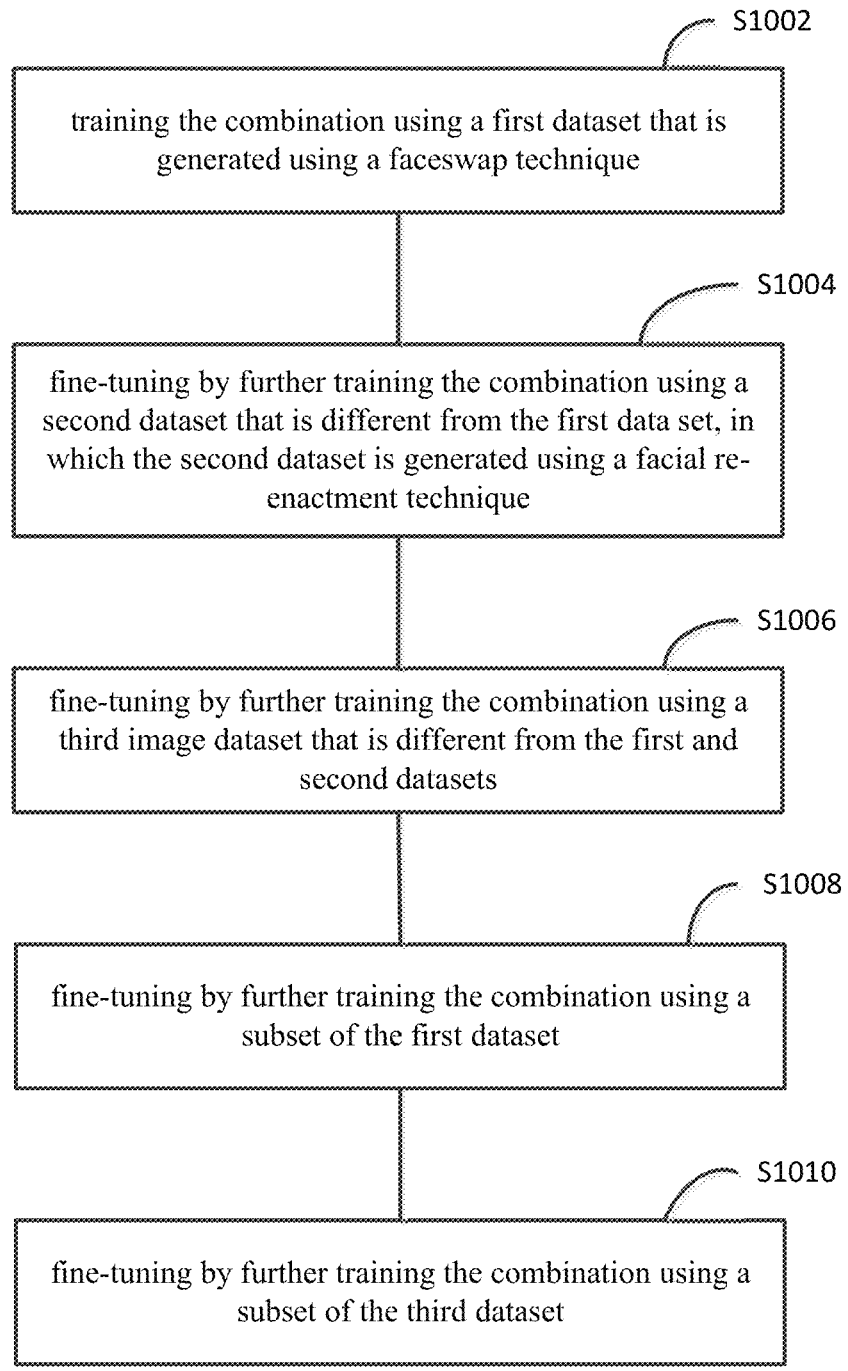
FIG. 10 is a flowchart for incremental learning in accordance with an exemplary aspect of the disclosure.

FIG. 10 is a flowchart for incremental learning in accordance with an exemplary aspect of the disclosure. The performance of models with incremental learning is shown in Table 3. In S1002, the models are fine-tuned on 280 k images from FaceSwap and Deefakes subsets from the FaceForensics++ dataset. In S1004, S1006, the models are fine-tuned on four different datasets: (1) Face2Face, (2) Neural Textures, (3) DFD and (4) DFDC. See Rössler et al; and Dolhansky et al.

TABLE 3

| Fine-Tuning Dataset | FS | DF | Pristine | F2F | NT | DFD | DFDC | Cumulative Accuracy |
|---|---|---|---|---|---|---|---|---|
| F2F | 95.00% | 99.28% | 100% | 99.28% | | | | 98.39% |
| Neural Textures | 96.42% | 99.28% | 100% | 100% | 94.28% | | | 98.00% |
| DFD | 97.85% | 100% | 98.56% | 98.57% | 90.00% | 99.28% | | 97.38% |
| DFDC | 93.57% | 92.14% | 76.97% | 88.57% | 51.42% | 93.27% | 91.69% | 83.95% |

Less than 0.5% of original data is used to fine tune the models with incremental learning. More specifically, in S1008, S1010, 2500 images are used to fine-tune the model on Face2Face, 2500 images on Neural Textures, 2500 images on DFD dataset, and 6000 images on DFDC dataset.

Note that the DFDC dataset includes around 1.5 million frames. Table 3 shows that the proposed models fine tuned on a small amount of data can still achieve good performance on new datasets, while maintaining their performance on the previous datasets. The main reason lies in the loss function in incremental learning. As mentioned above, the loss function consists of two parts: one part that measures the similarity between the weights from a new dataset and the old weights from the previous dataset, and the other one is to measure the accuracy of the training model on the new dataset. The former one forces the weights to be as similar as possible to the old weights, so it still performs well on the previous dataset. And the latter one guarantees that the model performs well on the new dataset.

Comparison

The results achieved are compared by the proposed models with state-of-the-art DeepFake detection systems. Image Transformer refers to the model trained with the settings as described above and Video Transformer refers to the model trained with the settings as described above. In Table 4, the results of fusing are demonstrated on the predictions from Image Transformer and Video Transformer by averaging the probabilities from both models to get the final output score. The fused models outperform state-of-the-art DeepFake detection systems on FaceForensics++ dataset, DFD dataset and DFDC datasets.

TABLE 4

| Method | FF+ | DFD | DFDC |
| --- | --- | --- | --- |
| Rossler et al. | 95.73% | 88.07% | 85.60% |
| Mittal et al. | | | 84.40% |
| Zhu et al. | 99.61% | 89.84% | 87.93% |
| Li et al. | | 93.34% | 73.52% |
| Bonettini et al. | | 89.35% | 85.71% |
| Guera et al. | 83.10% | | |
| Image + Image Fusion | 99.79% | 99.28% | 91.69% |

In Table 5, the video transformer model outperforms state-of-the-art detection systems when trained and tested on a specific subset of FaceForensics++ dataset: Face2Face. The video transformer model can be fine-tuned on a smaller amount of data and achieve better performance when compared to other methods as shown in Table 5. This demonstrates a more enhanced generalization capability of the video transformer model with incremental learning.

TABLE 5

| Method | Accuracy | Num. Train Images |
| --- | --- | --- |
| Rossler et al. | 98.36% | 870k |
| Afchar et al. | 84.56% | 9k |
| Zhu et al. | 98.22% | 172k |
| Li et al. | 98.64% | |
| Image + Image Fusion | 99.28% | 5k |

Numerous modifications and variations of the present invention are possible in light of the above teachings. It is therefore to be understood that within the scope of the appended claims, the invention may be practiced otherwise than as specifically described herein.

The invention claimed is:

1. A system for detecting DeepFake videos, comprising:
an input device for inputting a potential DeepFake video, wherein the input device is configured to input a sequence of video frames of the potential DeepFake video;
processing circuitry that
detects faces frame by frame in the potential DeepFake video to obtain consecutive face images,
creates UV texture maps from the face images,
inputs both face images and corresponding UV texture maps,
extracts image feature maps, by a convolution neural network (CNN) backbone, from the input face images and corresponding UV texture maps and forms an input data structure,
receives the input data structure, by a video transformer model that includes multiple encoders,
computes, by the video transformer model, a classification of the video as being Real or Fake; and
a display device that plays back the potential DeepFake video and an indication that the potential DeepFake video is Real or Fake,
the system further comprising:
learnable segment embeddings, wherein the learnable segment embeddings are a fixed token for the face image and a fixed token for the UV texture map, and
wherein the processing circuitry forms the input data structure including the extracted image feature maps and the learnable segment embeddings,
wherein all tokens belonging to the face image are assigned to a first vector (index 0), and all tokens belonging to the UV texture map are assigned to a second vector (index 1), and the first vector and the second vector are concatenated into a single feature vector.

2. The system of claim 1, further comprising:
a learnable positional embedding, wherein the learnable positional embedding is a position of a raster image within a video frame,
wherein the processing circuitry forms the input data structure including the extracted image feature maps and the learnable positional embedding.

3. The system of claim 1, the processing circuitry further comprising:
a training module that trains a combination of the CNN backbone and the transformer model using an incremental learning strategy, the incremental learning including
training the combination using a first dataset that is generated using a faceswap technique;
fine-tuning by further training the combination using a second dataset that is different from the first data set, in which the second dataset is generated using a facial re-enactment technique;
fine-tuning by further training the combination using a third image dataset that is different from the first and second datasets;
fine-tuning by further training the combination using a subset of the first dataset; and
fine-tuning by further training the combination using a subset of the third dataset.

4. The system of claim 3, wherein the training module trains the combination using a loss function, including:
measuring similarity between weights from a current dataset and a previous dataset, and
measuring accuracy of the training of the combination on the current training set.

5. A DeepFake detection system, comprising:
an artificial intelligence (AI) workstation;
a plurality of client computers connected to the AI workstation, wherein the AI workstation includes program instructions which when executed by processing circuitry having multiple processing cores, each processing core performs a method comprising:

inputting a sequence of video frames of a video;

detecting faces frame by frame in the video to obtain consecutive face images;

creating UV texture maps from the face images;

inputting both the face images and corresponding said UV texture maps;

extracting image feature maps, by a convolution neural network (CNN) backbone, from the face images and corresponding said UV texture maps and forming an input data structure;

receiving the input data structure, by a video transformer model that includes multiple encoders;

computing, by the video transformer model, a classification of the video as being Real or Fake; and the plurality of client computers each interacting with the AI workstation in parallel to detect whether a video being played in the respective client computer is Real or Fake and display an indication of the detection, the system further comprising:

learnable segment embeddings, wherein the learnable segment embeddings are a fixed token for the face image and a fixed token for the UV texture map, and wherein the processing circuitry forms the input data structure including the extracted image feature maps and the learnable segment embeddings, wherein all tokens belonging to the face image are assigned to a first vector (index 0), and all tokens belonging to the UV texture map are assigned to a second vector (index 1), and the first vector and the second vector are concatenated into a single feature vector.

6. The DeepFake detection system of claim 5, wherein the plurality of client computers each inserts a label into a video indicating that the video has been detected as being Real or Fake.

7. The DeepFake detection system of claim 5, wherein the plurality of client computers each stores those videos that have been detected as being Fake into a database of Fake videos.

8. The DeepFake detection system of claim 5, wherein the plurality of client computers each send a command to an external system to block a video that has been detected as being Fake from being streamed.

9. A non-transitory computer-readable medium that stores program instructions for implementing an embedded DeepFake detector which when executed by processing circuitry having multiple processing cores, each processing core, in parallel with others of the multiple processing cores, performs a method comprising:

receiving a sequence of video frames of a video captured from a streaming service;

detecting faces frame by frame in the video to obtain consecutive face images;

creating UV texture maps from the face images;

inputting both the face images and corresponding created UV texture maps;

extracting image feature maps, by a convolution neural network (CNN) backbone, from the face images and corresponding created UV texture maps and forming an input data structure;

receiving the input data structure, by a video transformer model consisting of multiple encoders;

computing, by the video transformer model, a classification of the video as being Real or Fake; and performing an action on the video depending on whether the video is detected as being Real or Fake, the method further comprising:

providing learnable segment embeddings, wherein the learnable segment embeddings are a fixed token for the face image and a fixed token for the UV texture map, and forming the input data structure including the extracted image feature maps and the learnable segment embeddings, wherein all tokens belonging to the face image are assigned to a first vector (index 0), and all tokens belonging to the UV texture map are assigned to a second vector (index 1), and the first vector and the second vector are concatenated into a single feature vector.

10. The non-transitory computer-readable medium of claim 9, wherein the method includes the action of inserting a label into a video indicating that the video has been detected as being Real or Fake.

11. The non-transitory computer-readable medium of claim 9, wherein the method includes the action of redirecting those videos that have been detected as being Fake into a database of Fake videos.

12. The non-transitory computer-readable medium of claim 9, wherein the method includes an action of blocking a video that has been detected as being Fake from being streamed by the video streaming service.

13. The non-transitory computer-readable medium of claim 9, wherein the detector is a mobile application that is installed in a mobile display device.

14. The non-transitory computer-readable medium of claim 9, wherein the detector is an application that is performed in a server computer.

15. The non-transitory computer-readable medium of claim 9, wherein the detector is a middleware device connected between the video streaming service and end user display devices.

16. The non-transitory computer-readable medium claim 9, further comprising an artificial intelligence (AI) workstation that trains the embedded DeepFake detector using an incremental learning strategy, the incremental learning including training the detector using a first dataset that is generated using a faceswap technique;

fine-tuning by further training the detector using a second dataset that is different from the first data set, in which the second dataset is generated using a facial re-enactment technique;

fine-tuning by further training the detector using a third image dataset that is different from the first and second datasets;

fine-tuning by further training the detector using a subset of the first dataset; and fine-tuning by further training the detector using a subset of the third dataset.

* * * * *